(12) United States Patent
Yabe

(10) Patent No.: US 7,859,589 B2
(45) Date of Patent: Dec. 28, 2010

(54) IMAGING APPARATUS, AND EXPOSURE CONTROL APPARATUS, METHOD, AND PROGRAM

(75) Inventor: Kazuhiro Yabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 593 days.

(21) Appl. No.: 11/517,298

(22) Filed: Sep. 8, 2006

(65) Prior Publication Data

US 2007/0070216 A1  Mar. 29, 2007

(30) Foreign Application Priority Data

Sep. 28, 2005  (JP) .......................... P2005-281379

(51) Int. Cl.
*H04N 5/238* (2006.01)

(52) U.S. Cl. .................... 348/364; 348/229.1; 348/235; 348/255

(58) Field of Classification Search .............. 348/229.1, 348/230.1, 235, 256, 297, 362, 363, 364, 348/365, 222.1, 234, 254, 255
See application file for complete search history.

(56) References Cited

U.S. PATENT DOCUMENTS

| 4,365,272 | A | * | 12/1982 | Nagai | 348/229.1 |
|---|---|---|---|---|---|
| 4,638,365 | A | * | 1/1987 | Kato | 348/229.1 |
| 5,353,058 | A | * | 10/1994 | Takei | 348/363 |
| 5,579,049 | A | * | 11/1996 | Shimaya et al. | 348/364 |
| 6,147,707 | A | * | 11/2000 | Terasawa et al. | 348/229.1 |
| 6,249,317 | B1 | * | 6/2001 | Hashimoto et al. | 348/364 |
| 6,753,908 | B1 | * | 6/2004 | Nakamura et al. | 348/223.1 |
| 7,251,057 | B2 | * | 7/2007 | Tsujino et al. | 358/1.9 |
| 7,397,499 | B2 | * | 7/2008 | Okada et al. | 348/208.13 |
| 7,468,746 | B2 | * | 12/2008 | Sugimoto | 348/229.1 |
| 2002/0033887 | A1 | * | 3/2002 | Hieda et al. | 348/220 |
| 2004/0165091 | A1 | * | 8/2004 | Takemura et al. | 348/296 |
| 2005/0248666 | A1 | * | 11/2005 | Kim et al. | 348/230.1 |

FOREIGN PATENT DOCUMENTS

| JP | 02-056180 | 2/1990 |
|---|---|---|
| JP | 05-041830 | 2/1993 |
| JP | 2002-118857 | 4/2002 |
| JP | 2003-299115 | 10/2003 |

* cited by examiner

*Primary Examiner*—Lin Ye
*Assistant Examiner*—Chriss S Yoder, III
(74) *Attorney, Agent, or Firm*—Finnegan, Henderson, Farabow, Garrett & Dunner, L.L.P.

(57) ABSTRACT

An imaging apparatus for capturing an image using a solid-state imaging device includes the following elements. One or more signal correction units correct an image signal obtained by capturing the image on a color component basis. A luminance detection unit detects luminance information from image signals obtained at locations prior to and subsequent to at least one of the signal correction units. An exposure control unit controls an exposure adjustment mechanism on the basis of the luminance information detected by the luminance detection unit.

13 Claims, 6 Drawing Sheets

IMAGING APPARATUS, AND EXPOSURE CONTROL APPARATUS, METHOD, AND PROGRAM

CROSS REFERENCES TO RELATED APPLICATIONS

The present invention contains subject matter related to Japanese Patent Application JP 2005-281379 filed in the Japanese Patent Office on Sep. 28, 2005, the entire contents of which are incorporated herein by reference.

BACKGROUND OF THE INVENTION

1. Field of the Invention

The present invention relates to imaging apparatuses, and exposure control apparatuses, methods, and programs. More specifically, the present invention relates to an imaging apparatus for capturing an image using a solid-state imaging device, and an exposure control apparatus, method, and program for controlling an exposure adjustment mechanism when capturing the image.

2. Description of the Related Art

In imaging apparatuses using solid-state imaging devices, such as digital still cameras and digital video cameras, generally, luminance information is detected for various types of photographing operation control such as exposure control. An imaging apparatus of the related art is disclosed in Japanese Unexamined Patent Application Publication No. 02-56180 in which a luminance level is detected for each of a plurality of areas from a captured image signal to perform exposure adjustment based on the luminance level of a priority area, and a gamma correction value is changed according to the contrast of each area to reduce overexposure and underexposure problems in a non-priority area.

In the imaging apparatus of the related art, a captured image signal is subjected to various types of image-quality correction based on digital computation such as white-balance adjustment. Recently, linear-matrix processing to enhance the color reproduction has attracted attention.

In the imaging apparatus of the related art, luminance information is detected at one specific location in a signal processing path, such as a location subsequent to a linear-matrix computation unit or a location subsequent to a white-balance adjustment unit, and photographing operation control and the like are performed using the detected luminance information. However, exposure control based on luminance information detected at one location encounters a problem in that it may be difficult to provide accurate exposure control, as described below.

FIG. 5 shows the relationship between the amount of light and the chrominance and luminance levels in an output signal from an imaging device.

Generally, exposure control is realized by determining a target luminance control value according to luminance information detected from a captured image signal and an exposure-control value based on various exposure settings and performing feedback control on exposure adjustment functions, such as an aperture diaphragm and an automatic gain control (AGC) device, so that the target luminance control value and the luminance information are matched. If the luminance information has a larger value than the target luminance control value, the aperture diaphragm is closed to reduce the amount of light directed to a light-receiving unit, thereby preventing overexposure. If the luminance information has a smaller value than the target luminance control value, the aperture diaphragm is opened or the gain is increased to increase the amount of light directed to the light-receiving unit, thereby preventing underexposure.

Such exposure control is based on the assumption that the luminance information has a large value when the amount of light directed to the light-receiving unit increases. In a typical light-receiving apparatus that converts incident light from an object into RGB signals, however, the relationship between the amount of incident light and the output signal of the light-receiving unit is obtained as shown in FIG. 5. That is, once light of more than a predetermined amount is incident, the output signal saturates. Further, the amount of light that saturates the output of each RGB color depends on the transmittance of the color filter or the sensitivity characteristic of the light-receiving device.

The luminance information for use in exposure control is generally represented by a weighted mean value of the signal values for RGB. As shown in FIG. 5, as the RGB output signal levels (chrominance levels) of the light-receiving unit saturate, the luminance signal level (luminance level) also saturates. If an amount of light sufficient to saturate the output signals of the light-receiving unit is incident, the outputs of the light-receiving unit do not change even when the exposure adjustment function is controlled, resulting in no change in the luminance information. Thus, accurate exposure adjustment is not realized.

In order to avoid the above-mentioned problem, the following control operations are performed. If the luminance level exceeds a predetermined value or does not change, it is determined that the amount of light is outside the controllable range, and the above-described feedback control is terminated until the amount of light falls within the controllable range. If the luminance level is considerably small, it is determined that the amount of light is below the controllable range, and the above-described feedback control is terminated until the amount of light falls within the controllable range.

Actually, an image is displayed on the screen after performing signal processing, such as linear-matrix computation or white-balance adjustment, on an output image signal of the light-receiving unit. If chrominance information is adjusted by such signal processing, a luminance signal generated from the chrominance information also has a different value from the luminance signal output from the light-receiving unit. In particular, a large change in the signal caused by linear-matrix computation or white-balance adjustment may result in incorrect exposure on a displayed (or recorded) image even through the exposure for the output image of the light-receiving unit is accurate. Therefore, a system in which luminance information is detected at only a location prior to the signal processing unit has a problem in that accurate exposure control may not be provided.

FIG. 6 shows the relationship between the amount of light and the chrominance and luminance levels in an image signal subjected to linear-matrix computation using a negative parameter.

In the linear-matrix computation, a computation parameter (matrix coefficient) is often set to a negative value to enhance the color reproduction. In a case where the effect of the negative parameter is large, the RGB signal levels and luminance level subjected to the linear-matrix computation vary in the manner shown in FIG. 6, and there appears a phenomenon in which, within a certain amount of light, the luminance level decreases with an increase in the amount of light. In this case, if exposure control similar to that described above is performed using luminance information detected from an image signal subjected to linear-matrix computation, for a region in which the luminance level decreases with an increase in the amount of light, the amount of light directed to the light-receiving unit is increased although the amount of light directed to the light-receiving unit should be restricted. As a result, accurate exposure control is not realized. Further, it fails to determine whether or not the amount of light is outside the controllable range.

When exposure control is performed using luminance information detected from an image signal subjected to white-balance adjustment, the luminance information may be changed due to the change in white-balance gain even though the exposure is correct in an environment where the amount of light directed to the light-receiving unit does not change, thereby suppressing accurate exposure control. Therefore, exposure control may not be accurately carried out even when luminance information is detected from an image signal subjected to linear-matrix computation or white-balance adjustment.

SUMMARY OF THE INVENTION

As described above, an imaging apparatus of the related art has a problem in that when exposure control is performed using luminance information detected at one location prior to or subsequent to a signal processing unit for performing linear-matrix computation or white-balance adjustment, accurate exposure control may not be realized due to the non-consideration of a change in the luminance information caused by the signal processing.

It is therefore desirable to provide an imaging apparatus and an exposure control apparatus, method, and a program in which accurate exposure control can be constantly carried out regardless of color correction for a captured image signal.

According to an embodiment of the present invention, an imaging apparatus for capturing an image using a solid-state imaging device, the imaging apparatus includes the following elements. One or more signal correcting means correct an image signal obtained by capturing the image on a color component basis. Luminance detecting means detects luminance information from image signals obtained at locations prior to and subsequent to at least one of the signal correcting means. Exposure controlling means controls an exposure adjustment mechanism on the basis of the luminance information detected by the luminance detecting means.

In the imaging apparatus, luminance information is detected by luminance detecting means from image signals obtained at locations prior to and subsequent to at least one signal correcting means, and an exposure adjustment mechanism is controlled by exposure controlling means on the basis of the detected luminance information. Therefore, accurate exposure control can be constantly realized regardless of any correction performed by the signal correcting means.

In an imaging apparatus according to an embodiment of the present invention, therefore, an exposure adjustment mechanism is controlled by exposure controlling means using luminance information detected by luminance detecting means from image signals obtained at locations prior to and subsequent to at least one signal correcting means, whereby accurate exposure control can constantly be carried out regardless of any correction, resulting in high-quality images.

DESCRIPTION OF THE PREFERRED EMBODIMENTS

An embodiment of the present invention will be described in detail with reference to the drawings.

Figure 1:
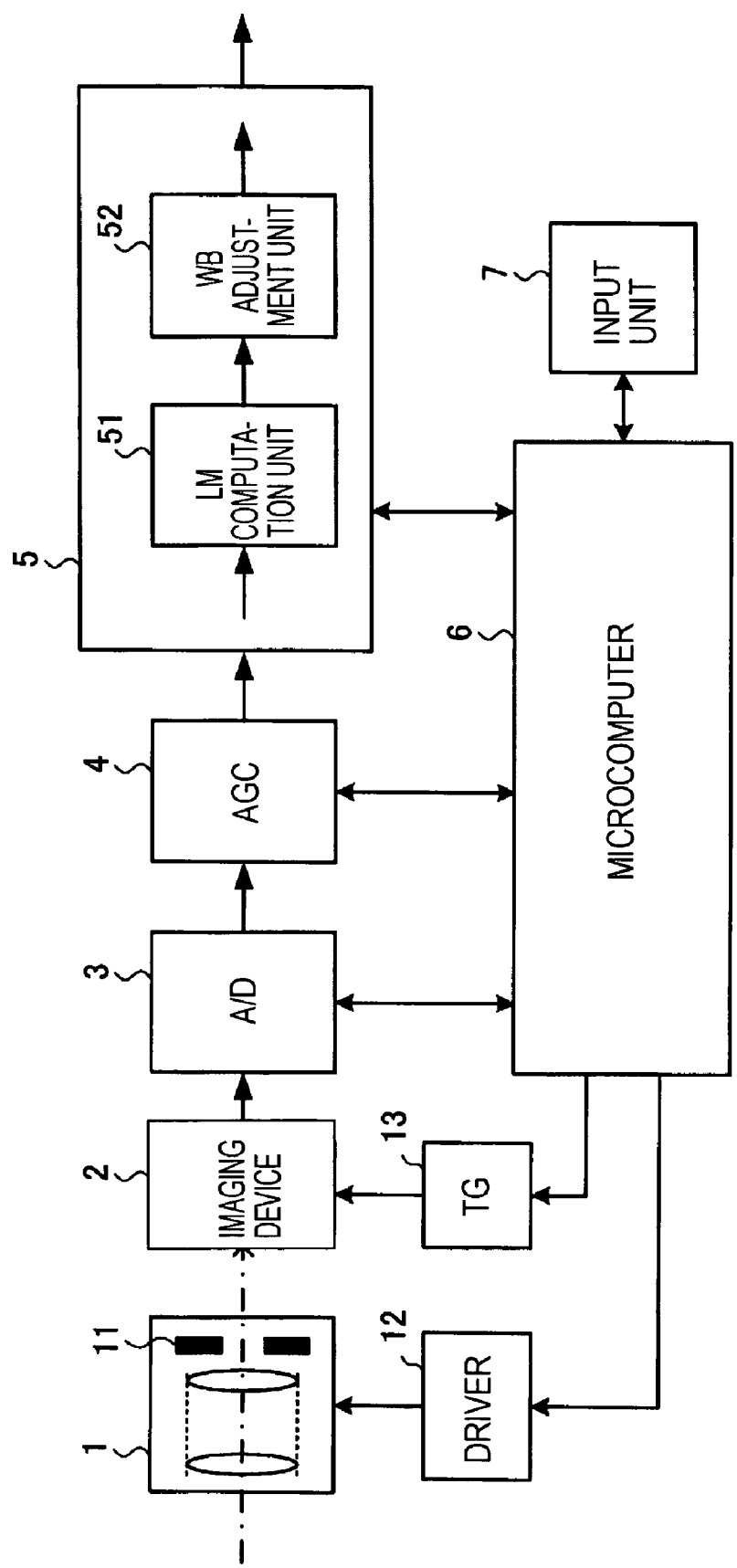
FIG. 1 is a block diagram showing the structure of the main part of an imaging apparatus according to an embodiment of the present invention.

FIG. 1 is a block diagram showing the structure of the main part of an imaging apparatus according to an embodiment of the present invention.

The imaging apparatus shown in FIG. 1 includes an optical block 1, an imaging device 2, an analog-to-digital (A/D) conversion circuit 3, an AGC circuit 4, a camera signal processing circuit 5, a microcontroller 6, and an input unit 7. The imaging apparatus further includes a driver 12 for driving a mechanism, such as an aperture diaphragm 11, inside the optical block 1, and a timing generator (TG) 13 for driving the imaging device 2.

The optical block 1 includes a lens for focusing a light beam from an object onto the imaging device 2, a driving mechanism for moving the lens for focusing or zooming, a mechanical shutter, and the aperture diaphragm 11. The driver 12 controls the driving of the components located inside the optical block 1 in response to a control signal from the microcontroller 6.

The imaging device 2 may be a charge-coupled-device (CCD) or complementary-metal-oxide-semiconductor (CMOS) solid-state imaging device, and is driven according to a timing signal output from the TG 13 to convert incident light from the object into an electrical signal. The TG 13 outputs a timing signal under the control of the microcontroller 6.

The A/D conversion circuit 3 performs correlated double sampling (CDS) processing to sample and hold the image signal output from the imaging device 2 so that a high signal-to-noise (S/N) ratio is maintained, and performs A/D conversion to produce a digital image signal. The AGC circuit 4 increases the gain of the digital image signal output from the A/D conversion circuit 3 under the control of the microcontroller 6. The analog image signal that has not been converted by the A/D conversion circuit 3 may be subjected to AGC.

The camera signal processing circuit 5 performs all or a part of various types of camera processing, such as auto focus (AF), auto exposure (AE), or white-balance adjustment, on the image signal output from the AGC circuit 4. In the embodiment, the camera signal processing circuit 5 includes a linear-matrix (LM) computation unit 51 that performs matrix computation on the individual color components of the input image signal, and a white-balance (WB) adjustment unit 52 that adjusts the gains for the individual color components.

The microcontroller 6 includes, for example, a central processing unit (CPU), a read only memory (ROM), and a random access memory (RAM). The microcontroller 6 executes a program stored in the ROM or the like to collectively control the respective components of the imaging apparatus, and also performs various computations for the control. The input unit 7 includes operation keys, dials, and levers for receiving an operation input from the user, and outputs a control signal corresponding to the input operation to the microcontroller 6.

In the imaging apparatus, signals generated by photoelectrically converting light received by the imaging device 2 are sequentially supplied to the A/D conversion circuit 3 to convert them into digital signals, and the gains of the digital signals are adjusted by the AGC circuit 4. The camera signal processing circuit 5 performs image-quality correction on the digital image signals supplied from the AGC circuit 4, and converts the resulting signals into luminance and color-difference signals to be finally output.

The image data output from the camera signal processing circuit 5 is fed to a graphic interface circuit (not shown) and is converted into an image signal for display, and a camera-through image is displayed on a monitor (not shown). When the user performs an input operation through the input unit 7 to instruct the microcontroller 6 to record an image, the image data from the camera signal processing circuit 5 is fed to a encoder/decoder (CODEC) (not shown), and is recorded onto a recording medium (not shown) after being subjected to predetermined compression encoding. A still image is recorded by supplying one frame of image data from the camera signal processing circuit 5 to the CODEC, and a moving image is recorded by sequentially supplying image data subjected to processing to the CODEC.

Figure 2:
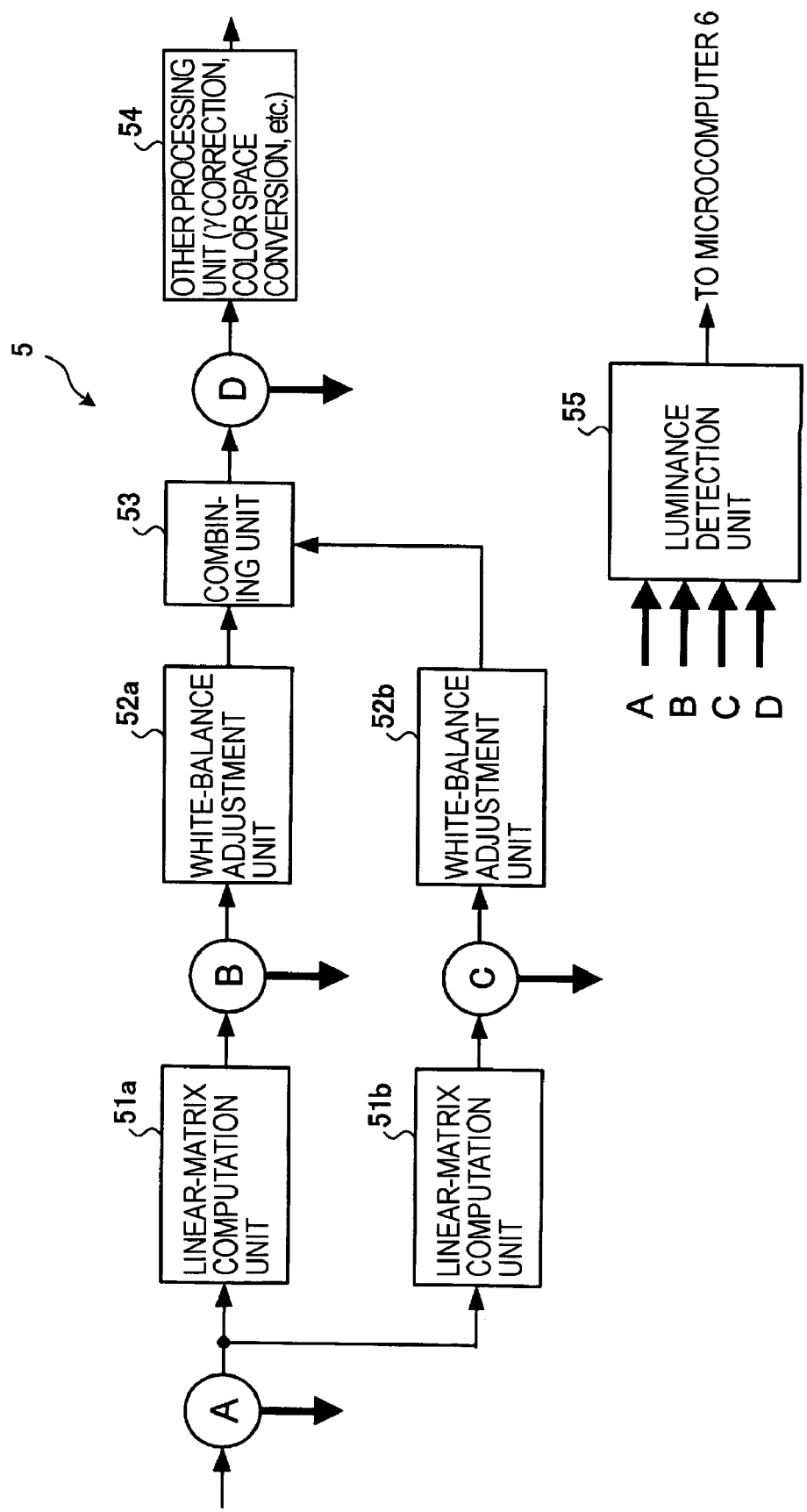
FIG. 2 is a block diagram showing the structure of the main part of a camera signal processing circuit.

FIG. 2 is a block diagram showing the structure of the main part of the camera signal processing circuit 5.

As shown in FIG. 2, the camera signal processing circuit 5 includes linear-matrix computation units 51a and 51b, white-balance adjustment units 52a and 52b, a combining unit 53, a processing unit 54, and a luminance detection unit 55.

The camera signal processing circuit 5 includes a first signal processing section having the linear-matrix computation unit 51a and the white-balance adjustment unit 52a, and a second signal processing section having the linear-matrix computation unit 51b and the white-balance adjustment unit 52b. Image signals subjected to image-quality correction processing in the first and second signal processing sections are combined by the combining unit 53 at a predetermined ratio, and the resulting composite signal is input to the signal processing unit 54.

In the camera signal processing circuit 5, an image signal from the AGC circuit 4 is subjected to processing, such as digital clamping to ensure accurate black levels, signal correction for a defective pixel in the imaging device 2, and shading for correcting lens vignetting, followed by de-mosaic processing. The linear-matrix computation units 51a and 52a perform computation according to Eqs. (1) and (2) below on the image signals (R, G, and B) subjected to the above-described processing. The coefficients a to i and j to r are set by the microcontroller 6.

$$\begin{pmatrix} R_{LM1} \\ G_{LM1} \\ B_{LM1} \end{pmatrix} = \begin{pmatrix} a & b & c \\ d & e & f \\ g & h & i \end{pmatrix} \begin{pmatrix} R \\ G \\ B \end{pmatrix} \quad (1)$$

$$\begin{pmatrix} R_{LM2} \\ G_{LM2} \\ B_{LM2} \end{pmatrix} = \begin{pmatrix} j & k & l \\ m & n & o \\ p & q & r \end{pmatrix} \begin{pmatrix} R \\ G \\ B \end{pmatrix} \quad (2)$$

The white-balance adjustment unit 52a performs computation according to Eq. (3) below on the image signals ($R_{LM1}$, $G_{LM1}$, and $B_{LM1}$) determined by the linear-matrix computation unit 51a. The white-balance adjustment unit 52b performs computation according to Eq. (4) below on the image signals ($R_{LM2}$, $G_{LM2}$, and $B_{LM2}$) determined by the linear-matrix computation unit 51b. Gain control values Rgain1, Ggain1, Bgain1, Rgain2, Ggain2, and Bgain2 are set by the microcontroller 6. For example, the microcontroller 6 determines gain control values that allow the respective RGB components to be equal to each other with respect to a white object on the basis of the image signals input to the white-balance adjustment units 52a and 52b, and sets the gain control values in the white-balance adjustment units 52a and 52b.

$$\left. \begin{aligned} R_{WB1} &= Rgain1 \times R_{LM1} \\ G_{WB1} &= Ggain1 \times G_{LM1} \\ B_{WB1} &= Bgaiu1 \times B_{LM1} \end{aligned} \right\} \quad (3)$$

$$\left. \begin{aligned} R_{WB2} &= Rgain2 \times R_{LM2} \\ G_{WB2} &= Ggain2 \times G_{LM2} \\ B_{WB2} &= Bgain2 \times B_{LM2} \end{aligned} \right\} \quad (4)$$

In the first signal processing section having the linear-matrix computation unit 51a and the white-balance adjustment unit 52a, the operation parameter (matrix coefficient) is determined so as to enhance the color reproduction. For example, the coefficient is determined so that the spectral characteristics of the RGB colors approach the characteristics of human visual sensitivity. The off-diagonal components (b, c, d, f, g, and h) of the coefficient may be negative. In the second signal processing section having the linear-matrix computation unit 51b and the white-balance adjustment unit 52b, on the other hand, the operation parameter (matrix coefficient) is determined so that noise would be less noticeable. For example, the coefficient is determined so that the matrix to be multiplied to the image signals (R, G, and B) becomes a unit matrix.

The combining unit 53 combines the image signals ($R_{WB1}$, $G_{WB1}$, and $B_{WB1}$) output from the first signal processing section and the image signals ($R_{WB2}$, $G_{WB2}$, and $B_{WB2}$) output from the second signal processing section according to Eq. (5) below. The combination ratio k is set by the microcontroller 6. In the embodiment, for example, the combination ratio k satisfies 0<k<1.

$$\left. \begin{aligned} R_{MIX} &= k \times R_{WB1} + (1-k) \times R_{WB2} \\ G_{MIX} &= k \times G_{WB1} + (1-k) \times G_{WB2} \\ B_{MIX} &= k \times B_{WB1} + (1-k) \times B_{WB2} \end{aligned} \right\} \quad (5)$$

The image signals ($R_{MIX}$, $G_{MIX}$, and $B_{MIX}$) output from the combining unit 53 are input to the processing unit 54. The processing unit 54 performs processing, such as γ correction and color space conversion (to generate luminance and color-difference signals).

The luminance detection unit 55 detects luminance information from the image signals at points A to D, and transmits the detection results to the microcontroller 6. Specifically, the point A is located at the input stage of the linear-matrix computation units 51a and 51b; the points B and C are located at the output stage of the linear-matrix computation units 51a and 51b, respectively; and the point D is located at the output stage of the combining unit 53. The luminance information is determined as, for example, an integral value of a luminance signal in a predetermined region of an image.

The luminance information detected at the points A to D has the following meaning:

The luminance information detected at the point A is based on a signal produced by increasing the gain of the image signal captured by the light-receiving unit (the imaging device 2) using the AGC circuit 4. That is, the luminance information detected at the point A has a value close to that of the luminance information obtained at the light-receiving unit. The luminance information detected at the point B is based on a signal subjected to color-reproduction-correction by the linear-matrix computation unit 51a, and the luminance information detected at the point C is based on a signal subjected to noise-reduction correction by the linear-matrix computation unit 51b. The luminance information detected at the point D is based on a signal obtained by combining the image signals output from the signal processing sections using the combining unit 53.

Accordingly, the luminance information is detected at a plurality of points placed prior to and subsequent to the processing blocks for linear-matrix computation and white-balance adjustment, and the microcontroller 6 performs exposure control based on the detected luminance information. Therefore, accurate exposure control can be constantly carried out regardless of the adjustment of the chrominance signals performed by the individual processing blocks.

Figure 3:
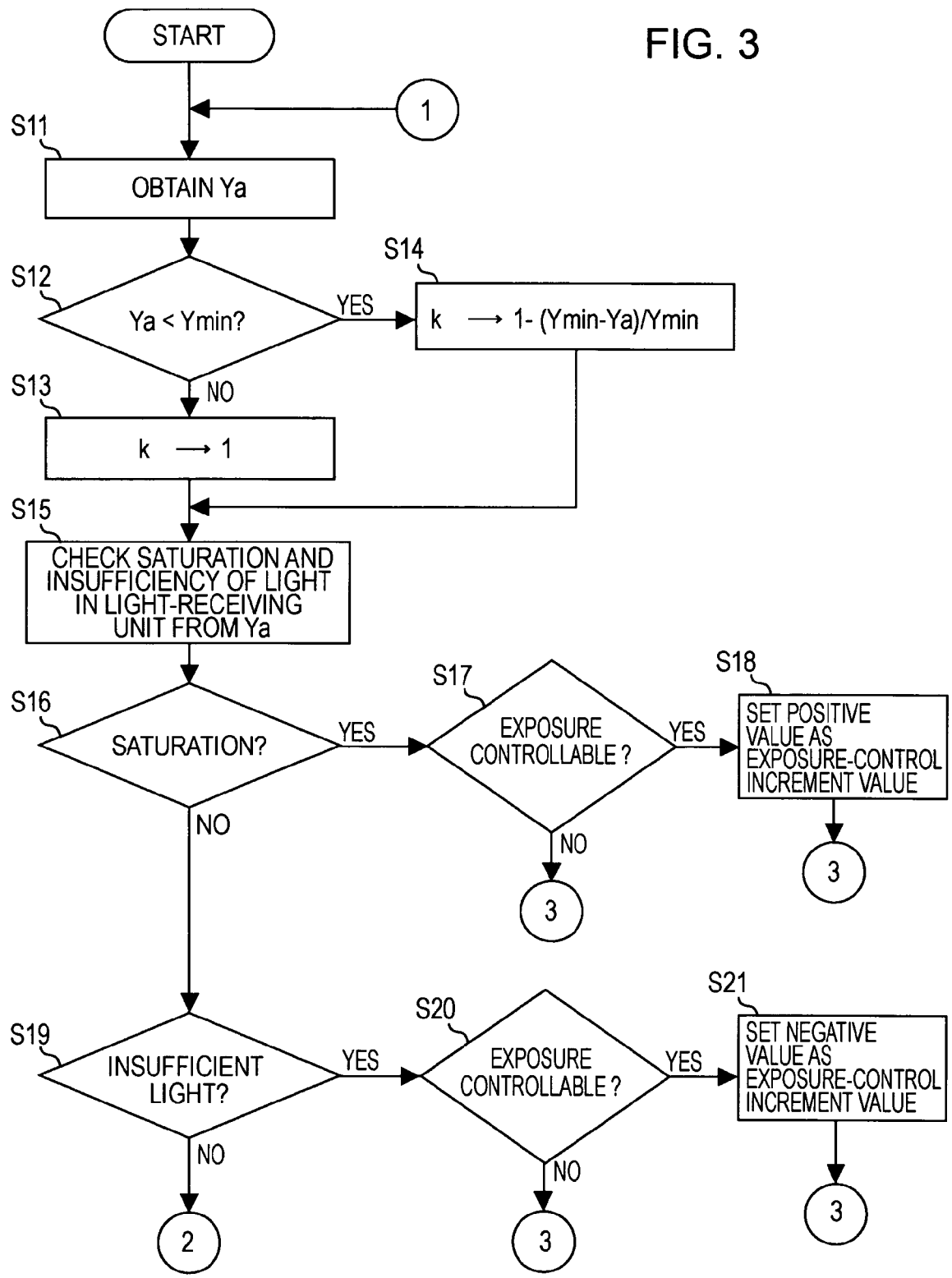
FIG. 3 is a flowchart showing a first part of an exposure control process that is performed by a microcontroller.
Figure 4:
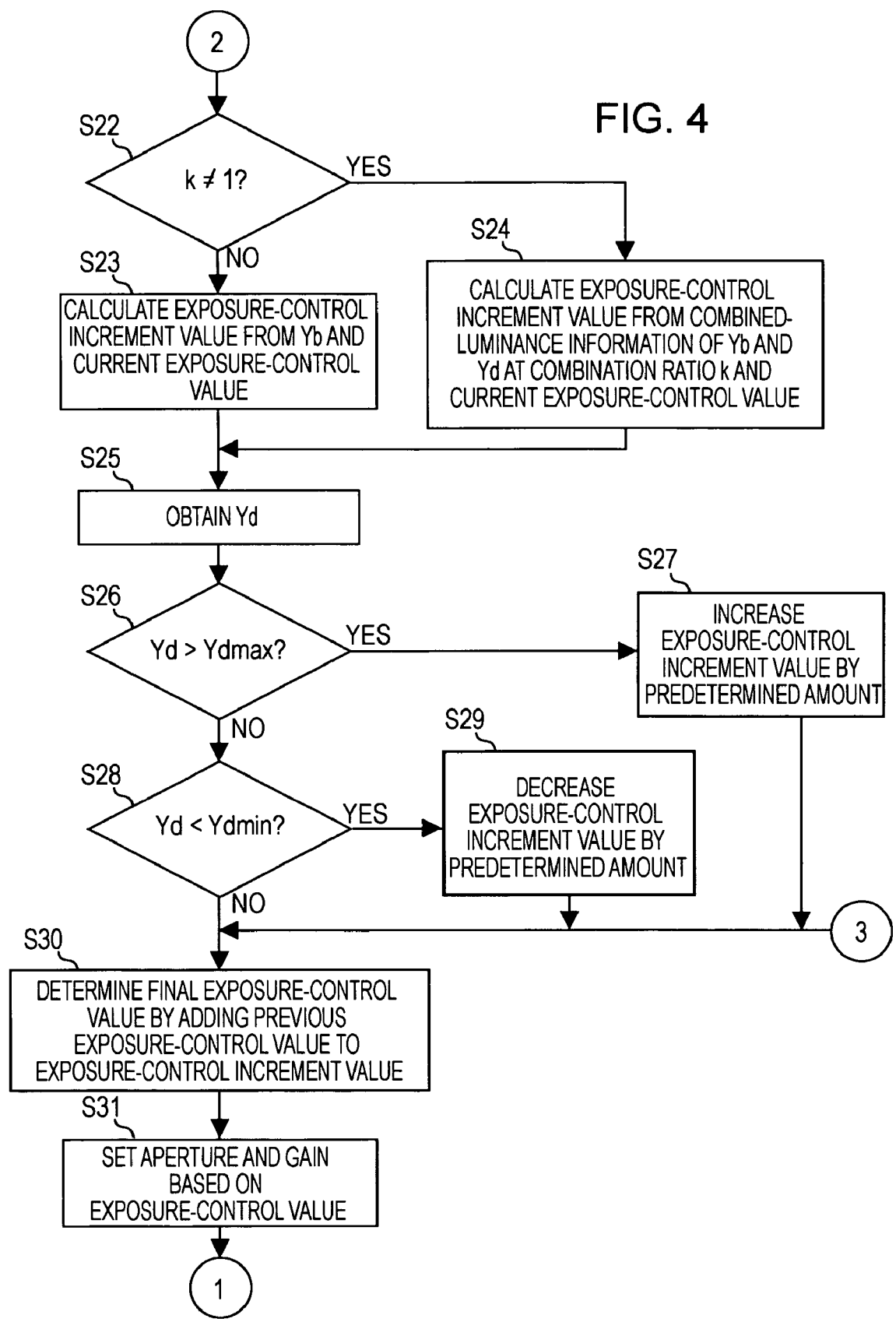
FIG. 4 is a flowchart showing a second part of the exposure-control process that is performed by the microcontroller.
Figure 5:
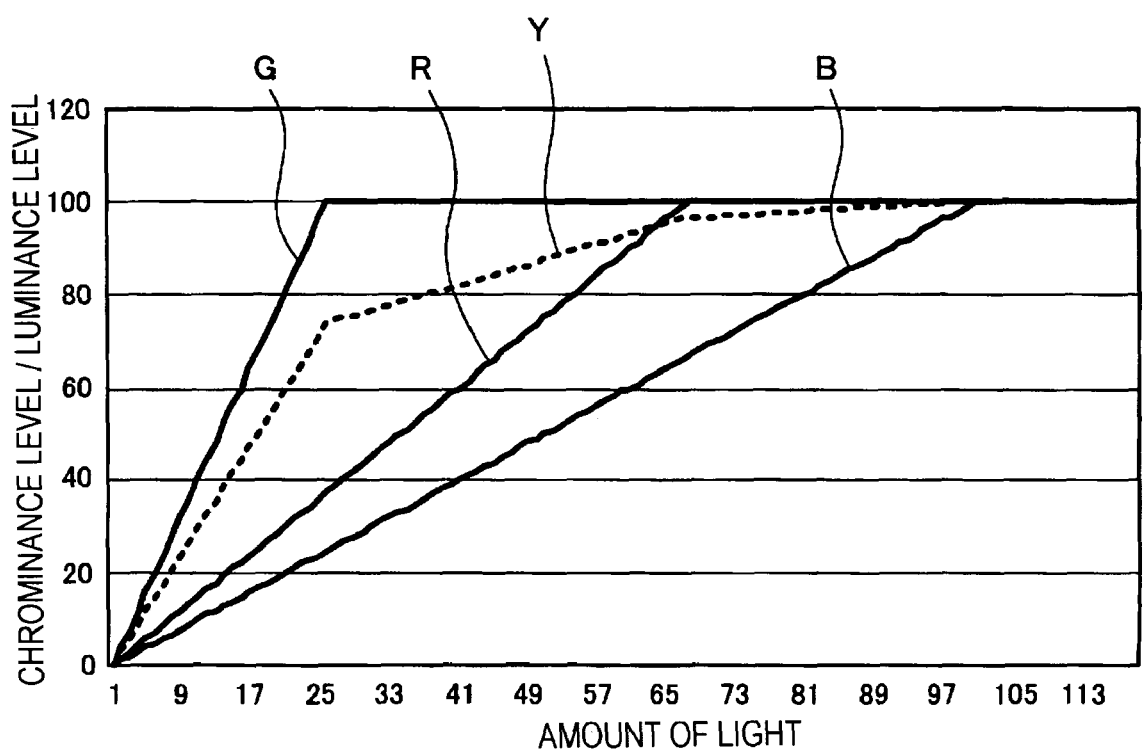
FIG. 5 is a diagram showing the relationship between the amount of light and the chrominance and luminance levels in an output signal from an imaging device.
Figure 6:
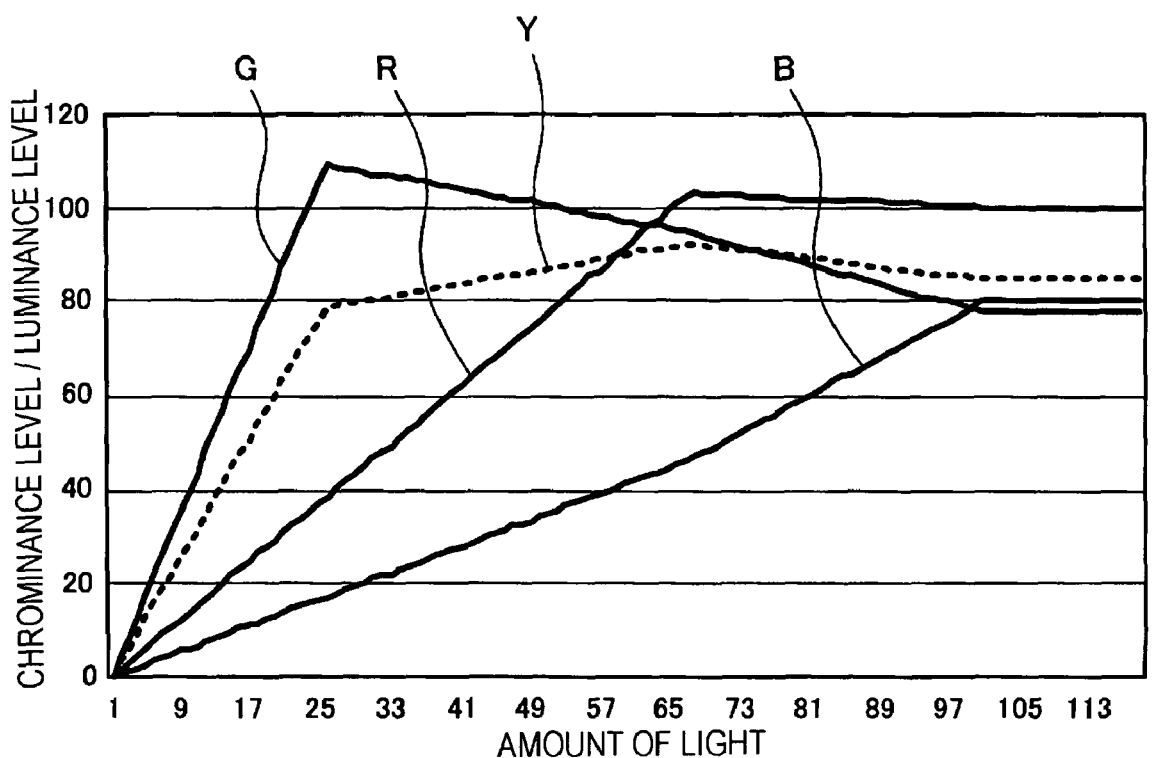
FIG. 6 is a diagram showing the relationship between the amount of light and the chrominance and luminance levels in an image-signal subjected to linear-matrix computation using a negative parameter.

A specific example of exposure control based on luminance information detected at the points A to D will be described. FIGS. 3 and 4 are flowcharts showing an exposure control process that is performed by the microcontroller 6.

First, the microcontroller 6 obtains luminance information Ya detected at the point A (step S11), and determines a combination ratio k at which the signals are combined by the combining unit 53 on the basis of the luminance information Ya. In normal exposure control, the combination ratio k is set to 1, and only the image signal obtained by the first signal processing section in which the color reproduction is enhanced is used. The image signal obtained by the second signal processing section in which noise is reduced is used under conditions where the aperture opens so that the amount of light no longer increases optically and where the gain set in the AGC circuit 4 exceeds a predetermined threshold value.

In the embodiment, a predetermined threshold value Ymin is set for the luminance information Ya satisfying those conditions. The luminance information Ya is compared with the threshold value Ymin (step S12), and the combination ratio k is determined according to a comparison result. If the luminance information Ya is smaller than the threshold value Ymin, the combination ratio k is determined according to Expression (6) below (step S14). If the luminance information Ya is equal to or greater than the threshold value Ymin, the combination ratio k is set to 1 according to Expression (7) below (step S13).

If $Ya < Ymin$, then, $k = 1 - (Ymin - Ya)/Ymin$ \hfill (6)

If $Ya \geq Ymin$, then, $k = 1$ \hfill (7)

By determining the combination ratio k according to those conditions, when an image of an object is captured under low illumination and many noise components are included in the image, an image signal subjected to image-quality correction by the second signal processing section so that the noise components are reduced can be combined at a higher ratio than an image signal obtained by the first signal processing section. As a result, a high-quality image with low noise can be obtained.

Then, the microcontroller 6 determines whether or not the light-receiving unit (the imaging device 2) suffers from signal saturation or insufficient light on the basis of the luminance information Ya (step S15). First, the luminance information Ya is compared with a predetermined threshold value (upper limit), and it is determined whether or not the input signal saturates with respect to the dynamic range due to the high level of incoming light (step S16).

If saturation occurs, the microcontroller 6 determines whether or not exposure control is currently enabled on the basis of the exposure-control value currently set for the exposure adjustment mechanism (step S17). That is, the microcontroller 6 determines whether or not the saturation is overcome by changing the exposure-control value so as to reduce the amount of light. The exposure-control value is a numerical measure of the amount by which the opening of the aperture diaphragm 11 and the gain of the AGC circuit 4 are controlled. The exposure-control value is increased to reduce the amount of light, and is decreased to increase the amount of light.

If it is determined in step S17 that exposure control is enabled, the microcontroller 6 sets a predetermined positive value for an exposure-control increment value (step S18). The exposure-control increment value is a value representing the amount of change with respect to the current exposure-control value. The exposure-control increment value is increased in order to reduce the target luminance value, that is, the amount of light, and is decreased in order to increase the target luminance value, that is, the amount of light. The process proceeds to step S30, in which the exposure-control increment value is added to the previous exposure-control value to determine a final exposure-control value. In step S31, the opening of the aperture diaphragm 11 and the gain of the AGC circuit 4 are determined according to the determined exposure-control value. A feedback control to the exposure adjustment mechanism is thus formed. Then, the process returns to step S11.

If it is determined in step S19 that the light is insufficient on the basis of the luminance information Ya, the microcontroller 6 determines whether or not exposure control is currently enabled based on the currently set exposure-control value (step S20). If exposure control is enabled, the microcontroller 6 sets a predetermined negative value for the exposure-control increment value (step S21). The process proceeds to step S30, in which the microcontroller 6 determines a final exposure-control value using the exposure-control increment value. Then, in step S31, the opening of the aperture diaphragm 11 and the gain of the AGC circuit 4 are determined according to the determined exposure-control value. A feedback control to the exposure adjustment mechanism is thus formed. Then, the process returns to step S11.

If it is determined in steps S17 and S20 that exposure control is not enabled, the process proceeds to step S30. In a case where the process proceeds from step S17 to step S30, the currently set exposure-control value is the maximum value (i.e., a value that minimizes the amount of light), and the exposure-control increment value has not been set. In step S31, therefore, the exposure-control value is still the maximum value, and the opening of the aperture diaphragm 11 and the gain of the AGC circuit 4 are determined according to the maximum exposure-control value. Then, the process returns to step S11. In a-case where the process proceeds from step S20 to step S30, the currently set exposure-control value is the minimum value (i.e., a value that maximizes the amount of light). In step S30, the minimum value is set as the exposure-control value, which is the same as the previous exposure-control value. In step S31, the opening of the aperture diaphragm 11 and the gain of the AGC circuit 4 are determined accordingly. Then, the process returns to step S11.

If it is determined in steps S17 and S20 that exposure control is not enabled, therefore, the feedback control to the exposure adjustment mechanism is terminated with the currently set exposure-control value being fixed. Thereafter, when it is determined in step S16 that no saturation occurs or if it is determined in step S19 that the light insufficiency problem is overcome, the process proceeds to step S22, and the feedback control is restarted.

If it is determined in steps S16 and S19 that the input signal does not saturate and insufficiency of the incident light does not occur, exposure control is performed based on a detection signal at another point. If the combination ratio k is 1 (step S22), that is, if only the signal obtained from the first signal processing section is used, the microcontroller 6 obtains luminance information Yb detected at the point B, and determines an exposure-control increment value from the detected luminance information Yb and the current exposure-control value (step S23). For example, the exposure-control increment value is decreased to increase the amount of incident light when the luminance information Yb does not reach the target luminance value, whereas the exposure-control increment value is increased to decrease the amount of incident light when the luminance information Yb exceeds the target luminance value.

If the combination ratio k is not 1 (step S22), that is, if the signal obtained from the second signal processing section is also used, the microcontroller 6 obtains the luminance information Yb detected at the point B and luminance information Yc detected at the point C, and determines combined-luminance information by combining the luminance information Yb and the luminance information Yc at the current combination ratio k. Then, the exposure-control increment value is determined from the determined combined-luminance information and the current exposure-control value (step S24).

Then, the microcontroller 6 obtains luminance information Yd detected at the point D (step S25), and compares the luminance information Yd with predetermined upper and lower limits Ydmax and Ydmin. If the luminance information Yd exceeds the upper limit Ydmax (step S26), the exposure-control increment value is increased by a predetermined amount (step S27). If the luminance information Yd is lower than the lower limit Ydmin (step S28), the exposure-control increment value is decreased by a predetermined amount (step S29).

Then, the exposure-control increment value determined in the processing described above is added to the previous exposure-control value to determine a final exposure-control value (step S30). The control values for the opening of the aperture diaphragm 11 and the gain of the AGC circuit 4 are determined according to the determined exposure-control value, and are set in the corresponding functions (step S31). Then, the process returns to step S11 and the control based on the luminance information Ya is performed.

According to the above-mentioned process, first, in the processing of steps S15 to S21, saturation of the image signal and an extreme insufficiency of light are checked based on the luminance information Ya detected at the point A closest to the output signal of the light-receiving unit. Thus, signal saturation and insufficiency of light can be accurately determined.

Then, in the processing of steps S23 and S24, the exposure-control value is corrected based on the luminance information detected from the image signal subjected to linear-matrix computation. Thus, even if accurate exposure adjustment is not performed for the image signal subjected to the computation even though accurate exposure adjustment is performed for the image signal that has not be subjected to the computation, the exposure can be corrected. Particularly when a simple increase in all the signals of the RGB component is not caused due to the increase in the amount of light by setting a negative coefficient for the linear-matrix computation parameter, accurate exposure adjustment can be performed.

Then, in the processing of steps S25 to S29, the exposure-control value is corrected on the basis of the luminance information Yd detected from the signal obtained by combining the output signals of the signal processing sections. Therefore, if white-balance adjustment causes a change in the luminance information and the exposure of the image subjected to the adjustment is not accurate, the exposure can be corrected. Further, accurate exposure control is achieved stably regardless of a change in the combination ratio k of the output signals obtained from the signal processing sections.

The above-described process allows constantly accurate exposure correction regardless of the adjustment of the chrominance signals without impairing the effect of image-quality correction achieved by linear-matrix computation and white-balance adjustment. As a result, a high-quality image can be obtained.

For simplicity of illustration, exposure control has been described above without consideration of shutter-speed control. In a setting where the shutter speed is fixed, a control procedure similar to that described above can be used. In a setting where the shutter speed is variable, for example, the shutter speed is increased when the detected luminance information exceeds the target luminance value, and is reduced when the detected luminance information does not reach the target luminance value. If the illumination is still low with a slow shutter speed and an opening of the aperture diaphragm 11, the gain of the AGC circuit 4 is increased.

The first and second signal processing sections in the camera signal processing circuit 5 may include not only the functions for linear-matrix computation and white-balance adjustment, as described above in the embodiment, but also any other image-quality correction function capable of individually adjusting the chrominance signal components. With the use of luminance information detected at locations prior to and subsequent to those functions, accurate exposure control can constantly be realized.

Imaging apparatuses including a solid-state imaging device, such as a digital video camera and a digital still camera, and apparatuses having such an imaging function, such as a mobile phone and a personal digital assistant (PDA) may fall within the scope of the present invention. Further, apparatuses for processing and recording imaging signals obtained by small cameras for video telephone systems or software games connected to personal computers (PCs) may also fall within the scope of the present invention.

The exposure control processing function described above can be implemented by a computer. In this case, a program describing the processing contents of the function to be possessed by the apparatus (such as the exposure control function by the microcontroller 6) is provided. The program is executed by the computer, thereby implementing the above-described processing function on the computer. The program describing the processing contents may be recorded on a computer-readable recording medium. Examples of the computer-readable recording medium include a magnetic recording apparatus, an optical disk, a magneto-optical disk, and a semiconductor memory.

In order to distribute the program, for example, a portable recording medium having the program recorded thereon, such as an optical disk or a semiconductor memory, is sold. The program may be stored in a storage device of a server computer, and may be transferred from the server computer to another computer via a network.

A computer that is to execute the program stores in its storage device the program recorded on a portable recording medium or the program transferred from the server computer. The computer reads the program from its storage device, and executes processing in accordance with the program. Alternatively, the computer may read the program directly from the portable recording medium, and may execute the processing in accordance with the program. Each time the program is transferred from the server computer, the computer may sequentially execute the processing in accordance with the received program.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus for capturing an image using a solid-state imaging device, the imaging apparatus comprising:
   signal correcting means for correcting an image signal obtained by capturing the image on a color component basis, the signal correcting means further comprising:
      linear-matrix computation means for performing matrix conversion on color components of an input image signal, and
      white-balance adjusting means for adjusting the white balance of an output signal of the linear-matrix computation means;
   luminance detecting means for:
      detecting luminance information comprising first luminance information and second luminance information from image signals, the first luminance information detected prior to the signal correcting means and the second luminance information detected at least in part subsequent to the signal correcting means, and
      detecting the luminance information from an input signal of the linear-matrix computation means, an input signal of the white-balance adjusting means, and an output signal of the white-balance adjusting means; and
   exposure controlling means for controlling an exposure adjustment mechanism on the basis of the luminance information detected by the luminance detecting means,
   wherein the exposure controlling means determines a control amount by which the exposure adjustment mechanism is to be controlled according to the first luminance information, and then corrects the control amount according to the second luminance information.

2. The imaging apparatus according to claim 1, wherein:
   the exposure controlling means determines whether or not the level of the image signal saturates on the basis of the first luminance information;
   when it is determined that the level of the image signal saturates, the exposure controlling means controls the exposure adjustment mechanism to minimize the amount of light, and waits for elimination of the saturation; and
   when the saturation is eliminated, the exposure controlling means determines the control amount by which the exposure adjustment mechanism is to be controlled according to the second luminance information.

3. The imaging apparatus according to claim 1, wherein:
   the exposure controlling means determines the amount of light incident on the solid-state imaging device on the basis of the first luminance information;
   when it is determined that the amount of light is insufficient, the exposure controlling means controls the exposure adjustment mechanism to maximize the amount of light, and waits until the amount of light becomes sufficient; and
   when the amount of light becomes sufficient, the exposure controlling means determines the control amount by which the exposure adjustment mechanism is to be controlled according to the second luminance information.

4. The imaging apparatus according to claim 1, wherein:
   the exposure controlling means determines whether or not the level of the image signal saturates on the basis of the luminance information detected from the input signal of the linear-matrix computation means;
   when it is determined that the level of the image signal saturates, the exposure controlling means controls the exposure adjustment mechanism to minimize the amount of light, and waits for elimination of the saturation; and
   when the saturation is eliminated, the exposure controlling means determines the control amount by which the exposure adjustment mechanism is to be controlled according to the luminance information detected from the input signal of the white-balance adjusting means, and corrects the control amount according to the luminance information detected from the output signal of the white-balance adjusting means.

5. The imaging apparatus according to claim 1, wherein:
   the exposure controlling means determines the amount of light incident on the solid-state imaging device on the basis of the luminance information detected from the input signal of the linear-matrix computation means;
   when it is determined that the amount of light is insufficient, the exposure controlling means controls the exposure adjustment mechanism to minimize the amount of light, and waits until the amount of light becomes sufficient; and
   when the amount of light becomes sufficient, the exposure controlling means determines the control amount by which the exposure adjustment mechanism is to be controlled according to the luminance information detected from the input signal of the white-balance adjusting means, and corrects the control amount according to the luminance information detected from the output signal of the white-balance adjusting means.

6. The imaging apparatus according to claim 1, wherein the signal correcting means includes white-balance adjusting means for adjusting white balance of an input image signal.

7. The imaging apparatus according to claim 1, wherein the signal correcting means includes:
   a plurality of linear-matrix computation means for performing matrix conversion on color components of an input image signal using different coefficients; and
   signal combining means for combining output signals of the plurality of linear-matrix computation means at a predetermined ratio; and
   the luminance detecting means detects luminance information from an input signal of each of the linear-matrix computation means and an output signal of the signal combining means.

8. The imaging apparatus according to claim 7, wherein the signal correcting means further includes a plurality of white-balance adjusting means for adjusting the white balance of output signals of the plurality of linear-matrix computation means and outputting the white-balance-adjusted signals to the signal combining means, and the luminance detecting means detects luminance information from the input signal of each of the linear-matrix computation means, an input signal of each of the white-balance adjusting means, and the output signal of the signal combining means.

9. An exposure control apparatus for controlling an exposure adjustment mechanism on the basis of a captured image signal obtained by a solid-state imaging device, the exposure control apparatus comprising:

luminance obtaining means for:
obtaining first luminance information detected prior to at least one linear-matrix computation unit,
obtaining second luminance information detected subsequent to the at least one linear-matrix computation unit and prior to at least one white-balance adjustment unit, and
obtaining third luminance information detected subsequent to the at least one white-balance adjustment unit; and control-amount determining means for determining a control amount by which the exposure adjustment mechanism is to be controlled according to the first luminance information, and then correcting the control amount according to the second luminance information and the third luminance information.

10. An exposure control method for controlling an exposure adjustment mechanism on the basis of a captured image signal obtained by a solid-state imaging device, the exposure control method comprising the steps of:

obtaining first luminance information detected prior to at least one linear-matrix computation unit;
obtaining second luminance information detected subsequent to the at least one linear-matrix computation unit and prior to at least one white-balance adjustment unit;
obtaining third luminance information detected subsequent to the at least one white-balance adjustment unit;
determining a control amount by which the exposure adjustment mechanism is to be controlled according to the first luminance information; and
correcting the control amount according to the second luminance information and the third luminance information.

11. A computer-readable medium comprising program instructions, which, when executed by a processor, cause the processor to perform a method for controlling an exposure adjustment mechanism on the basis of a captured image signal obtained by a solid-state imaging device, the method comprising:

obtaining first luminance information detected prior to at least one linear-matrix computation unit;
obtaining second luminance information detected subsequent to the at least one linear-matrix computation unit and prior to at least one white-balance adjustment unit;
obtaining third luminance information detected subsequent to the at least one white-balance adjustment unit;
determining a control amount by which the exposure adjustment mechanism is to be controlled according to the first luminance information; and
correcting the control amount according to the second luminance information and the third luminance information.

12. An imaging apparatus for capturing an image using a solid-state imaging device, the imaging apparatus comprising:

at least one linear-matrix computation unit;
at least one white-balance adjustment unit;
a luminance detection unit configured to:
detect first luminance information prior to an input of the at least one linear-matrix computation unit,
detect second luminance information subsequent to an output of the at least one linear-matrix computation unit and prior to an input of the at least one white-balance adjustment unit, and
detect third luminance information subsequent to an output of the at least one white-balance adjustment unit; and an exposure control unit configured to control an exposure adjustment mechanism on the basis of the luminance information detected by the luminance detection unit, wherein the exposure controlling unit is further configured to determine a control amount by which the exposure adjustment mechanism is to be controlled according to the first luminance information, and then correct the control amount according to the second luminance information and the third luminance information.

13. An exposure control apparatus for controlling an exposure adjustment mechanism on the basis of a captured image signal obtained by a solid-state imaging device, the exposure control apparatus comprising:

a luminance obtaining unit configured to:
obtain first luminance information detected prior to at least one linear-matrix computation unit,
obtain second luminance information detected subsequent to the at least one linear-matrix computation unit and prior to at least one white-balance adjustment unit, and
obtaining third luminance information detected subsequent to the at least one white-balance adjustment unit; and a control-amount determining unit configured to determine a control amount by which the exposure adjustment mechanism is to be controlled according to the first luminance information, and then correct the control amount according to the second luminance information and the third luminance information.

* * * * *